US010737650B2

(12) United States Patent
Ga et al.

(10) Patent No.: US 10,737,650 B2
(45) Date of Patent: Aug. 11, 2020

(54) SENSOR-CONNECTED PASSENGER DETECTION METHOD AND PASSENGER OCCUPANCY DETECTION SYSTEM

(71) Applicants: Hyundai Motor Company, Seoul (KR); Kia Motors Corporation, Seoul (KR)

(72) Inventors: Han-Seon Ga, Gyeonggi-do (KR); Joon-Sang Jo, Gyeonggi-do (KR); Joung-Hee Lee, Gyeonggi-do (KR); Jae-Hwan Jeon, Seoul (KR); Sang-Hyup Lee, Gyeonggi-do (KR); Hyun-Dong Her, Seoul (KR); Myung-Ki Yeom, Incheon (KR); Ju-Yong Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/179,959

(22) Filed: Nov. 4, 2018

(65) Prior Publication Data
US 2019/0344738 A1 Nov. 14, 2019

(30) Foreign Application Priority Data
May 8, 2018 (KR) ........................ 10-2018-0052474

(51) Int. Cl.
*B60R 21/0132* (2006.01)
*B60R 21/015* (2006.01)

(52) U.S. Cl.
CPC .... *B60R 21/0132* (2013.01); *B60R 21/01516* (2014.10); *B60R 21/01536* (2014.10); *B60R 2021/01327* (2013.01)

(58) Field of Classification Search
None
See application file for complete search history.

(56) References Cited

U.S. PATENT DOCUMENTS

| 2010/0152961 | A1  | 6/2010  | Atri et al. |
| 2010/0324774 | A1* | 12/2010 | Bouni ................. B60R 21/0152 |
|              |     |         | 701/31.4 |
| 2016/0035154 | A1  | 2/2016  | Lejarza et al. |
| 2016/0337814 | A1* | 11/2016 | Van Wiemeersch ........................ |
|              |     |         | H04W 4/046 |

FOREIGN PATENT DOCUMENTS

| KR | 10-1305896 B1 | 9/2013 |
| KR | 10-1514419 B1 | 4/2015 |
| KR | 10-1766147 B1 | 8/2017 |
| WO | 2006/048077 A1 | 5/2006 |

* cited by examiner

*Primary Examiner* — Anne Marie Antonucci
(74) *Attorney, Agent, or Firm* — Mintz Levin Cohn Ferris Glovsky and Popeo, P.C.; Peter F. Corless

(57) ABSTRACT

A passenger occupancy detection system is provided that implements a sensor-connected passenger detection method. The system includes that a sensor controller that reads a sensor value using an ESC as an acceleration sensor when a vehicle is stopped and distinguishes an in-vehicle passenger with a vehicle acceleration change by the sensor value. The operations of a rear-seat passenger notification system 200 and a passenger-seat occupant classification advanced airbag system 300 are connected by the distinguishing the in-vehicle passenger, enhancing the sensor reliability by providing Fail-Safe together with increasing the accuracy of the passenger detection utilizing longitudinal/lateral accelerations/yaw rate information.

14 Claims, 9 Drawing Sheets

SENSOR-CONNECTED PASSENGER DETECTION METHOD AND PASSENGER OCCUPANCY DETECTION SYSTEM

CROSS-REFERENCE TO RELATED APPLICATION

This application claims priority to Korean Patent Application No. 10-2018-0052474 filed on May 8, 2018, which is incorporated herein by reference in its entirety.

BACKGROUND

Field of the Disclosure

The present disclosure relates to a passenger detection method, and more particularly, to a passenger detection method utilizing a passenger occupancy detection system, which enhances the reliability thereof by implementing Fail-Safe for a sensor.

Description of Related Art

Recently, a passenger occupancy detection system applied to a vehicle enhances the operation reliability for a safety system mounted on the vehicle by accurately confirming the presence of passenger with a sensor. Accordingly, the passenger occupancy detection system is operated in connection with a passenger-on-passenger-seat identification advanced airbag system utilizing a weight detection sensor (or a passenger classification sensor) or operated in connection with a rear-seat passenger notification system utilizing a door opening sensor and an ultrasonic sensor.

For example, the passenger occupancy detection system classifies the passenger into a child and an adult using a weight detection sensor (or a passenger classification sensor) seated on a passenger seat, and thus, the passenger-seat passenger classification advanced airbag system is capable of deploying the airbag classified into a child-use and an adult-use based upon the weight detection. As a result, when the passenger-seat occupant classification advanced airbag system determines the airbag deployment using passenger information and a collision signal of the passenger seat, the airbag control unit (ACU) determines the airbag deployment classified into a child protection-use and an adult protection-use based on the passenger information confirmed as a child and an adult.

The passenger occupancy detection system distinguishes passenger motion by the door opening sensor and the ultrasonic sensor mounted on an indoor headlining, to allow the rear-seat passenger notification system to recognize the opening/closing of a rear door of a vehicle, and then accurately detect the motion of the passenger occupied in the rear seat beyond delivering a confirmation message to a driver through a cluster. As a result, the rear-seat passenger notification system determines whether a person is occupying in the rear seat based on the opening/closing of the rear door of the vehicle, then determines whether the passenger is present by detecting an indoor motion in the ultrasonic sensor, and turns on an emergency light, beeps an alarm sound, and concurrently sends a text message to the driver.

Accordingly, the passenger occupancy detection system utilizes the weight detection sensor (or the passenger classification sensor) or the ultrasonic sensor, thus greatly enhancing vehicle safety performance, such as the passenger-seat occupant classification advanced airbag system and the rear-seat passenger notification system.

However, the passenger occupancy detection system requires a safety enhancement against a failure or an error of the sensor since the sensor operation of the passenger occupancy detection system determines the operational reliability of the passenger-seat occupant classification advanced airbag system and the rear-seat passenger notification system. For example, the passenger-seat occupant classification advanced airbag system is implemented by the passenger occupancy detection system utilizing the weight detection sensor, resulting in non-operation of the airbag when the weight on the seat of the weight detection sensor is not accurately detected. The non-operation of the airbag is caused by an adult sitting in an incorrect posture, or a sensor detection failure due to non-recognition by a seat cover, or a malfunction or a failure due to sensor deterioration or other causes, and as a result, there is a risk of serious injury to the passenger.

Additionally, the rear-seat passenger notification system can be implemented by the passenger occupancy detection system utilizing the ultrasonic sensor, thus possibly causing a false alarm upon malfunction of the ultrasonic sensor for detecting the indoor motion to determine whether the passenger is present. The rear-seat passenger notification system also has the limitation in determining whether the passenger is present and whether the rear door of the vehicle is opened/closed with only the door opening sensor.

As described above, it is very important that the passenger-seat occupant classification advanced airbag system and the rear-seat passenger notification system obtain the reliability of the sensor for the stability of its operation.

The contents described in Description of Related Art are to help the understanding of the background of the present disclosure, and can include what is not previously known to those skilled in the art to which the present disclosure pertains.

SUMMARY

Accordingly, an object of the present disclosure is to provide the sensor-connected passenger detection method and passenger occupancy detection system, which replaces the weight sensor or the ultrasonic sensor while individually operating the rear-seat passenger notification system and the passenger-seat occupant classification advanced airbag system in connection with an electronic stability control (ESC) sensor, thus saving cost, and particularly, use longitudinal/lateral accelerations/yaw rate detected in the ESC sensor, thus enhancing the reliability of the sensor by implementing the Fail-Safe together with increasing the accuracy of the passenger detection.

In a passenger detection method of the present disclosure for achieving the object, a sensor controller may be configured to determine an acceleration sensor value causing vehicle acceleration change when a vehicle is stopped, and distinguish an in-vehicle passenger for the passenger to implement passenger safety with the acceleration sensor value. The passenger safety may be achieved for any one of the boarding/exiting of the passenger, the boarding/exiting location thereof, and the motion thereof.

Additionally, the distinguishing the in-vehicle passenger may be performed by recognizing passenger location and passenger classification of the passenger by determining (e.g., reading) the acceleration sensor value for detecting the vehicle acceleration change when the vehicle is stopped, and calculating the change amount thereof; determining an operation condition for a rear-seat passenger notification system when the door of the vehicle is opened; and distinguishing an operation of an advanced system operating the rear-seat passenger notification system using the acceleration sensor value as Fail-Safe for an ultrasonic sensor.

The acceleration sensor value is a longitudinal acceleration, a lateral acceleration, and a yaw rate. The passenger location is distinguished by a passenger occupancy seat for a vehicle seat, and the passenger classification is distinguished as a child and an adult for the load. The passenger occupant seat is classified into a driver seat at a driver location, a front passenger seat at a front passenger location, a rear left seat at a rear left location, a rear middle seat at a rear middle location, and a rear right seat at a rear right location.

The operation of the rear-seat passenger notification system may be implemented by activating the rear-seat passenger notification system; detecting the passenger motion by the acceleration-based passenger motion using the acceleration sensor value; confirming the passenger motion by performing the Fail-Safe for the sensor-based passenger motion of the ultrasonic sensor detecting the passenger motion with the acceleration-based passenger motion; and providing passenger information regarding the passenger motion to a driver. The acceleration-based passenger motion may be determined by correcting the acceleration sensor value, distinguishing the change in the acceleration sensor value, distinguishing the passenger change, and detecting the acceleration-based passenger motion by calculating the acceleration sensor value.

Additionally, the correction is an unnecessary noise removal by a Low Pass Filter (LPF). The change may be performed by an abrupt difference between previous acceleration value and current acceleration value through the filtering at a predetermined interval. The distinguishing the passenger change may be performed considering the signal generation of a door opening sensor together. The calculation may be performed by the frequency analysis and variance for the longitudinal acceleration and the lateral acceleration, and the change time of the yaw rate may be considered. The confirming the passenger motion may be performed by the acceleration-based passenger motion when the ultrasonic sensor is not applied. The passenger information may be classified into in-vehicle information using a flashing lamp or a warning sound of the passenger display unit and driver information using a smartphone.

The operation of the passenger-seat occupant classification advanced airbag system may be implemented by activating the passenger-seat occupant classification advanced airbag system; generating an airbag operation signal by setting the passenger classification as an acceleration-based passenger classification, setting the passenger classification of the weight sensor as a sensor-based passenger classification, and performing the Fail-Safe for the sensor-based passenger classification with the acceleration-based passenger classification; and performing the airbag deployment with the airbag operation signal. Further, the airbag operation signal may be generated by the acceleration-based passenger classification when the weight sensor is not applied.

A passenger occupancy detection system of the present disclosure may include an acceleration sensor configured to detect vehicle acceleration change as a sensor value; a door opening sensor configured to detect the opening/closing of a vehicle door; and a sensor controller configured to distinguish an in-vehicle passenger using a sensor value of the acceleration sensor when a vehicle is stopped, and operating individually by distinguishing an operation of a rear-seat passenger notification system based on a vehicle door opening situation and an operation of a passenger-seat occupant classification advanced airbag system depending upon an airbag deployment situation.

The acceleration sensor may be an ESC sensor of an ESC, and the ESC sensor may be a microelectromechanical system (MEMS) acceleration sensor. The sensor controller may be configured to utilize the acceleration sensor as Fail-Safe for an ultrasonic sensor upon operation of the rear-seat passenger notification system, or utilize the acceleration sensor as Fail-Safe for a weight sensor upon operation of the passenger-seat occupant classification advanced airbag system. Additionally, the sensor controller may be configured to provide the distinguishing the in-vehicle passenger to a passenger display unit of a driver seat cluster or to a smartphone of a driver.

The passenger occupancy detection system of the present disclosure implements the following operations and effects by enhancing the sensor reliability by passenger detection in connection with the ESC sensor (e.g., the acceleration sensor).

First, the advanced airbag system implements cost savings and Fail-Safe compared to the conventional technology since it is possible to resolve the non-deployment possibility of the airbag due to non-genuine sensor or seat, or the occupancy of the adult's inaccurate posture, which are the disadvantages of the conventional passenger detection sensor in connection with the advanced airbag system, utilizing the Fail-Safe connected with the ESC sensor that is a basic sensor of the ESC-applied vehicle, and to save cost while effectively preventing the passenger injury by using the ESC sensor together with the weight detection sensor (or the passenger classification sensor) or replacing it.

Second, the rear-seat passenger notification system implements cost savings and Fail-Safe compared to the conventional technology since it is possible to increase the possibility of the passenger occupancy that the rear-seat passenger notification system determines with only the door opening sensor utilizing the Fail-Safe connected with the ESC sensor that is a basic sensor of the ESC-applied vehicle, and to save cost while effectively recognizing the passenger by using the ESC sensor together with the indoor ultrasonic sensor or replacing it.

Third, an electronic controlled suspension (ECS)/an electronic control suspension (ESC)/a traction control system (TCS) implement chassis-integrated control with improved performance since it is possible to enable a cooperative control by weight estimation that operates on each location by the ECS when the passenger at a specific location is present, and to enable a cooperative control by weight bias that operates on a specific wheel by the ESC/TCS.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

Figure 1:
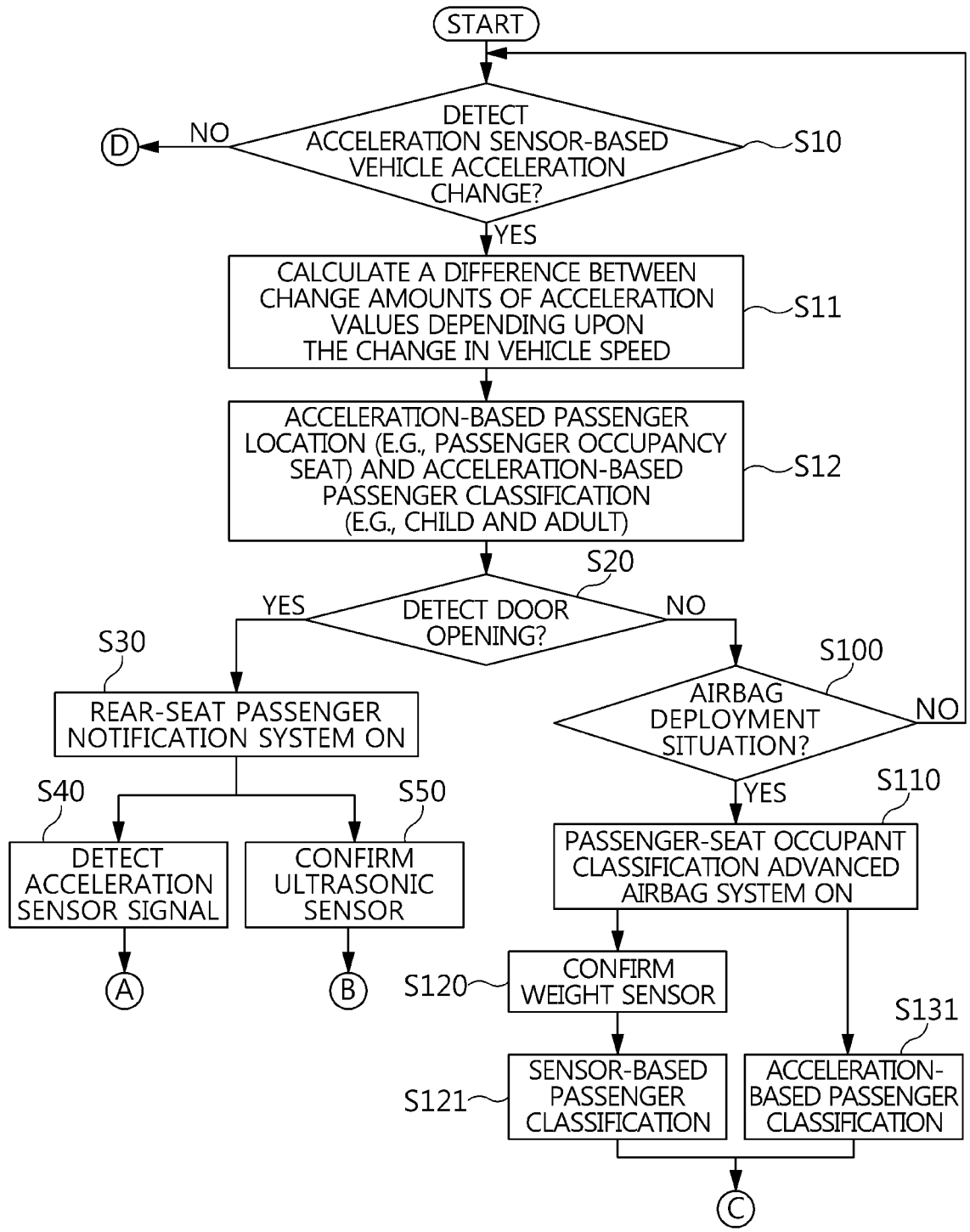
FIGS. 1 and 2 are flowcharts of a sensor-connected passenger detection method in accordance with an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present disclosure will be described in detail with reference to the accompanying drawings, and the embodiment is one example and may be implemented in many different forms by those skilled in the art to which the present disclosure pertains, such that the exemplary embodiment described herein is not limited thereto.

Figure 2:
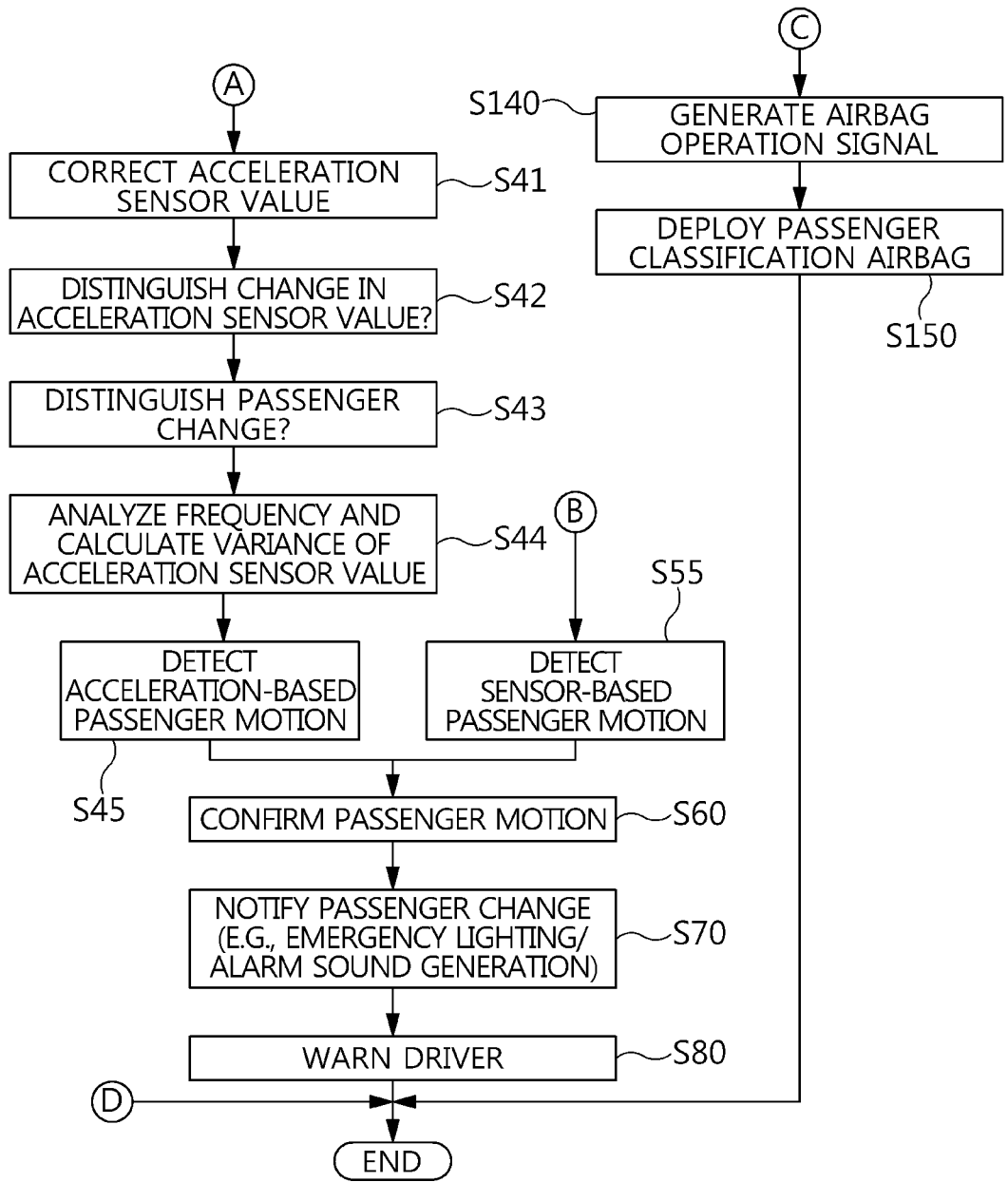

Referring to FIGS. 1 and 2, a sensor-connected passenger detection method is classified into recognizing a passenger by an acceleration sensor S10~S12, and then distinguishing the operation of an advanced system individually performed depending upon a rear-seat passenger and a front passenger-seat occupant. Particularly, the distinguishing of the operation of the advanced system is classified into operating a rear-seat passenger notification system based on Fail-Safe of an ultrasonic sensor through an acceleration sensor upon opening of the door S20~S80 and operating a passenger-seat occupant classification advanced airbag system based on Fail-Safe of a weight sensor through the acceleration sensor upon the airbag deployment S100~S150.

Accordingly, the sensor-connected passenger detection method uses vehicle acceleration change by a sensor value of the acceleration sensor for distinguishing an in-vehicle passenger when the vehicle is stopped or has collided, such that a cooperative control with the rear-seat passenger notification system or the passenger-seat occupant classification advanced airbag system, which is the system related with the passenger safety, is implemented. Particularly, since the sensor-connected passenger detection method considers that the door opening is mainly performed by the boarding/exiting of the passenger, while the airbag deployment is performed by a vehicle collision accident, the operations of the rear-seat passenger notification system and the passenger-seat occupant classification advanced airbag system may be performed by an independent control procedure.

Figure 3:
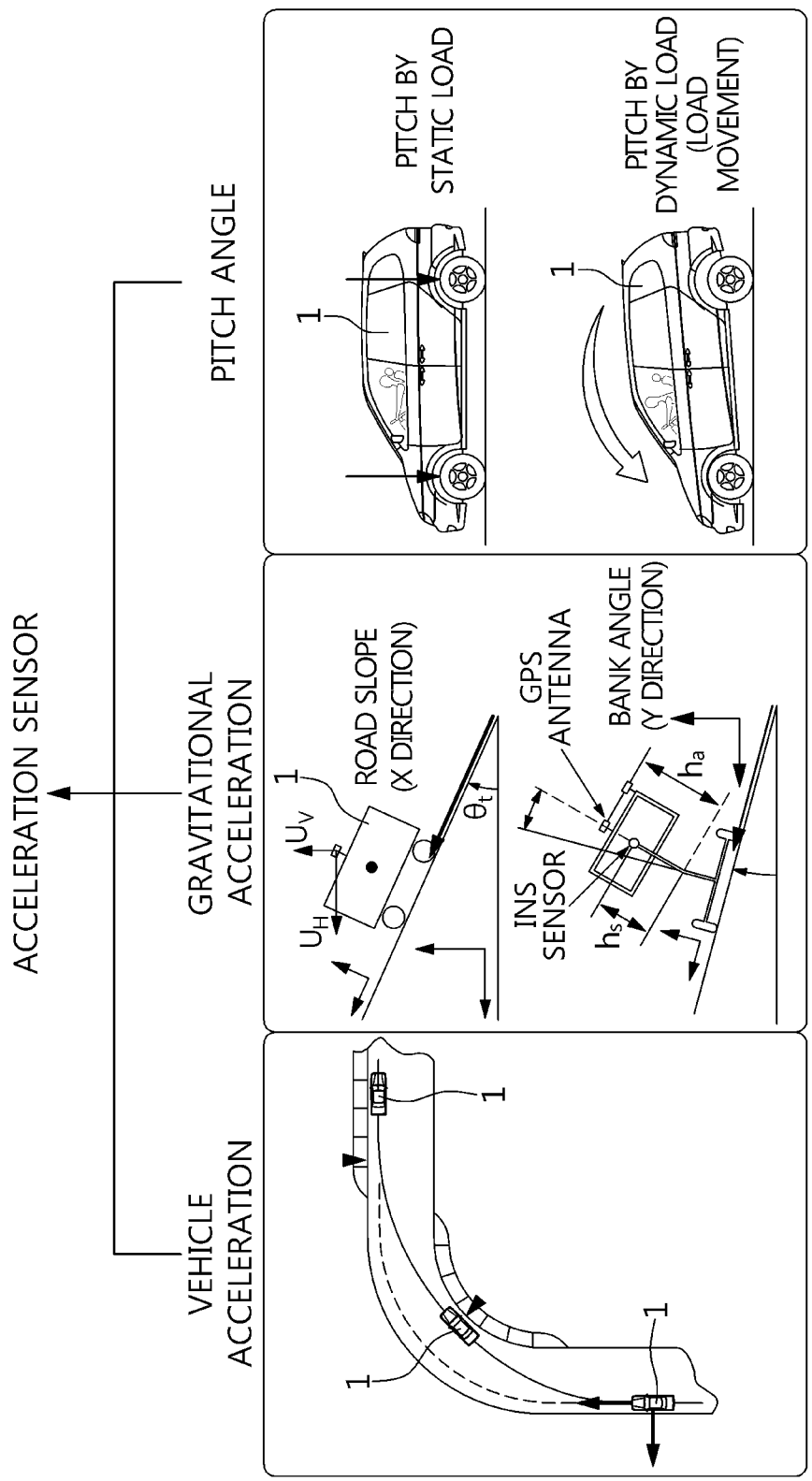
FIG. 3 is a conceptual principle of the sensor-connected passenger detection method in accordance with an exemplary embodiment of the present disclosure.

Referring to FIG. 3, unlike KEY-OFF of the vehicle indicating that the vehicle acceleration component is zero, the change in weight when the vehicle is stopped causes the change in the acceleration sensor value used to detect passenger occupancy and state by analyzing the changed value, such that the acceleration sensor value does not become zero due to gravitational acceleration, pitch angle, noise, etc. when the vehicle is stopped. In this case, x in the x, y, z coordinate system indicate the front of the vehicle, and y indicates the side of the vehicle.

Accordingly, the acceleration sensor embodies the principle of reading each of the vehicle acceleration (i.e., Ax (longitudinal acceleration), Ay (lateral acceleration)), the gravitational acceleration (a slope of a road surface), and the pitch angle (i.e., YawRate). For this purpose, the acceleration sensor uses a micro electro mechanical systems (MEMS) type acceleration sensor mounted on a vehicle 1 and applied to an electronic stability control (ESC) as an ESC sensor. In particular, the ESC performs a braking force control by Torque Vectoring.

Accordingly, the sensor-connected passenger detection method utilizes the change values of the longitudinal/lateral accelerations (Ax, Ay)/yaw rate of the ESC sensor (i.e., the MEMS acceleration sensor) that is a basic configuration of the ESC, thus replacing the passenger-seat occupant classification sensor (i.e., the weight sensor) or implementing the Fail-Safe for the advanced airbag system, or replacing the ultrasonic sensor or implementing the Fail-Safe for the rear-seat passenger notification system.

Figure 4:
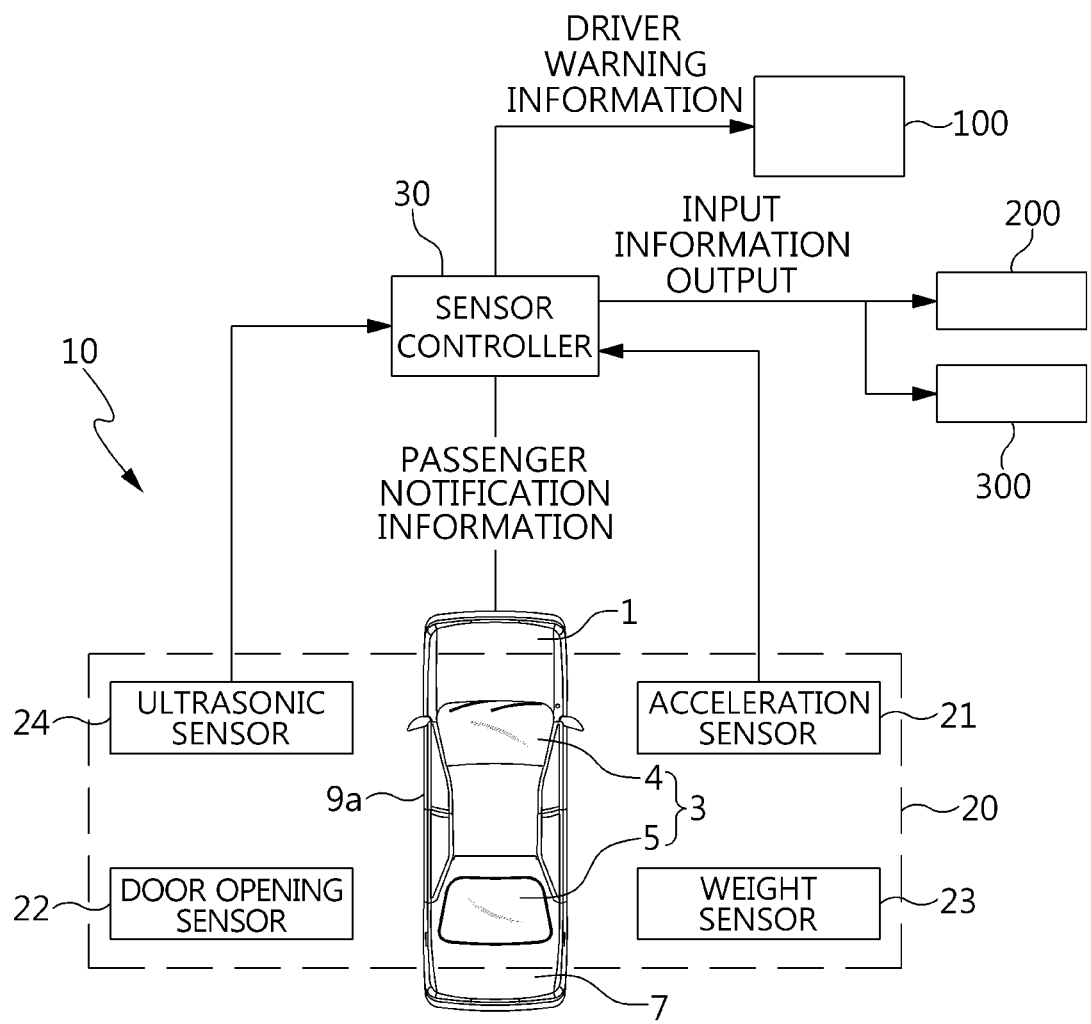
FIG. 4 is a configuration diagram of a sensor-connected passenger occupancy detection system in accordance with an exemplary embodiment of the present disclosure.

Referring to FIG. 4, a passenger occupancy detection system 10 mounted on the vehicle 1 may include a sensor unit 20 and a sensor controller 30. For example, the vehicle 1 may include a seat 3 classified into a front seat 4 and a rear seat 5 and on which a passenger may be seated, a trunk 7 in which the cargo may be loaded, and a driver seat cluster having a passenger display unit 9a.

In particular, the sensor unit 20 may include an acceleration sensor 21, a door opening sensor 22, a weight sensor 23, and an ultrasonic sensor 24. The acceleration sensor 21 may be a MEMS acceleration sensor used as an ESC sensor. Accordingly, the acceleration sensor 21 may be configured to detect the change amount of an acceleration sensor value that changes based on a passenger occupancy location and weight from the vehicle acceleration change caused by the boarding or exiting of the passenger as each change value for the longitudinal acceleration (Ax), the lateral acceleration (Ay), and the yaw rate, and transmits these values to the sensor controller 30. The door opening sensor 22 may be configured to generate a door opening signal by the passenger; the weight sensor 23 may be configured to generate a passenger classification signal classified into a child and an adult with the weight of the passenger occupied on the seat 3; the ultrasonic sensor 24 may be configured to generate a passenger motion signal with the motion of the passenger occupied on the seat 3; and these signals may be transmitted to the sensor controller 30.

For example, the sensor controller 30 may be configured to detect the vehicle acceleration change from the acceleration sensor 21, detect the vehicle door opening state with the door opening signal of the door opening sensor 22, adjust an airbag operation for a child and an adult with the passenger classification signal of the weight sensor 23, and detect the boarding or exiting of the passenger in the vehicle 1 with the passenger motion signal of the ultrasonic sensor 24. Particularly, the sensor controller 30 may be configured to detect the boarding/exiting of the passenger in the vehicle 1 with each change value for the longitudinal acceleration (Ax) of the acceleration sensor 21, the lateral acceleration (Ay) thereof, and the yaw rate thereof, distinguishing the passenger occupied on the seat 3 by analyzing the change amount/variance/frequency of the change value, and detect the passenger state (e.g., motion, sleep, etc.) by continuously monitoring each of the longitudinal acceleration (Ax), the lateral acceleration (Ay), and the yaw rate.

In addition, the sensor controller 30 may be configured to transmit a notification to the passenger display unit 9a of a driver seat cluster 9 and a driver's smartphone 100 of the change in the boarding/exiting of the passenger in the vehicle 1 due to the door opening. The passenger display unit 9a may be configured to use a warning lamp or an alarm sound to output the notification. In addition, the sensor controller 30 may be configured to output the input information for operations of a rear-seat passenger notification system 200 and a passenger-seat occupant classification advanced airbag system 300.

Hereinafter, the sensor-connected passenger detection method of FIGS. 1 and 2 will be described in detail with reference to FIGS. 3 to 7. In particular, the control subject is the sensor controller 30 configured to use the acceleration sensor 21 as the main passenger detection device; the detection object is the passenger in the vehicle 1; and the control object is the rear-seat passenger notification system 200 and the passenger-seat occupant classification advanced airbag system 300 that operate using the output of the sensor controller 30 as the input information.

Referring to FIG. 1, the sensor controller 30 may be configured to classify recognizing the passenger S10~S12 into detecting the vehicle acceleration change S10, calculating the difference between the change amounts of the acceleration values S11, and determining the passenger S12. Referring to FIG. 4, the sensor controller 30 may be configured to detect the acceleration sensor-based vehicle acceleration change using the signal of the acceleration sensor 21 as the input information in the detecting of the vehicle acceleration change S10. The sensor controller 30 may then be configured to calculate the difference between the change amounts of the acceleration values for the vehicle acceleration change by applying the change in the detected acceleration sensor-based vehicle acceleration to the calculating the difference between the change amounts of the acceleration values S11.

As a result, the sensor controller 30 may be configured to apply the calculated difference between the change amounts of the acceleration value to the determining of the passenger S12 to determine the passenger occupancy seat with the acceleration-based passenger location and simultaneously to determine a child and an adult by the acceleration-based passenger classification. In particular, the sensor controller 30 may be configured to receive the signal of the weight sensor 23 and the signal of the ultrasonic sensor 24 as the input information, but they are not used in the recognizing the passenger S10~S12.

Figure 5:
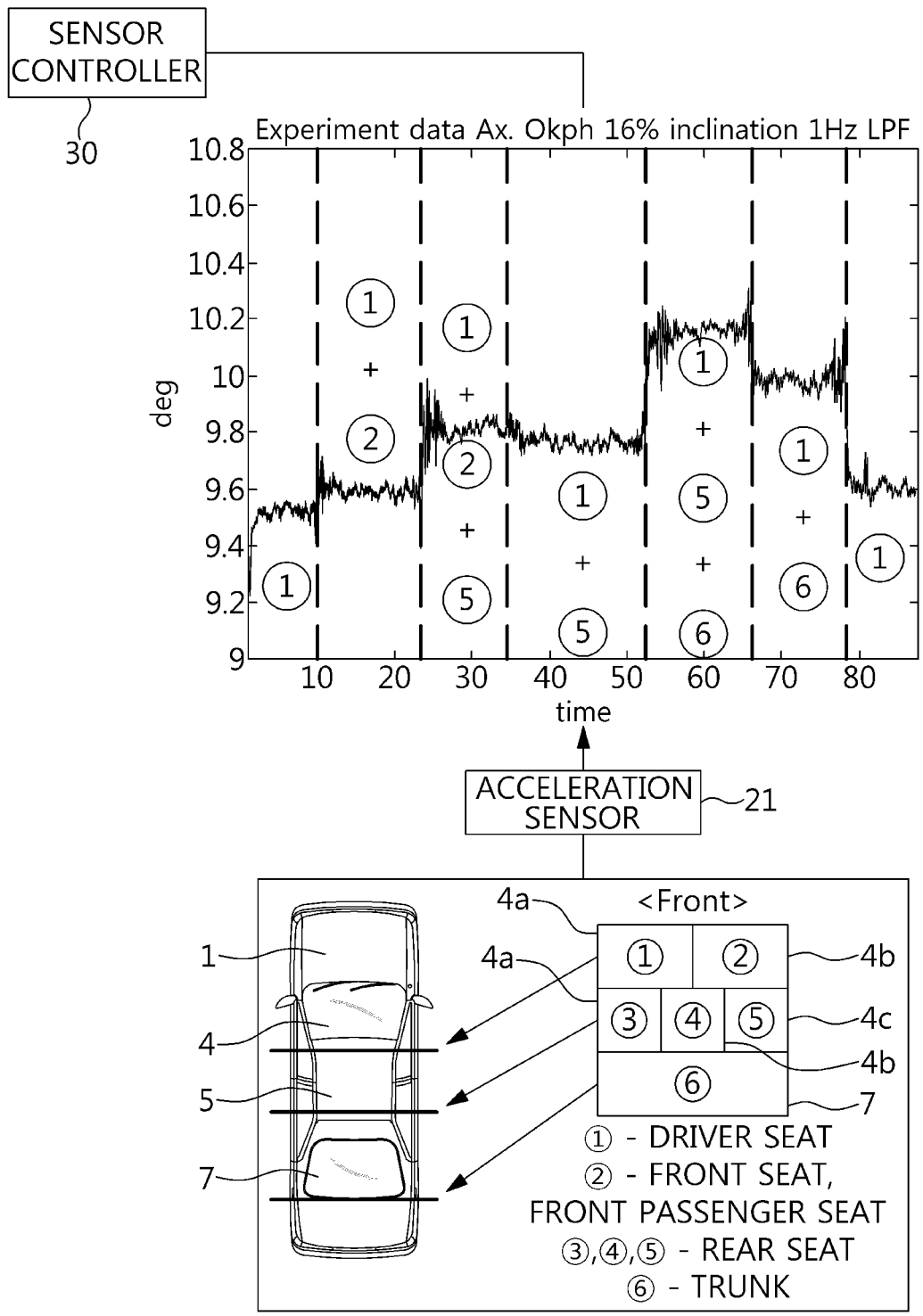
FIG. 5 illustrates a view in which the passenger location is confirmed by an acceleration sensor-based vehicle acceleration change in accordance with an exemplary embodiment of the present disclosure.
Figure 6:
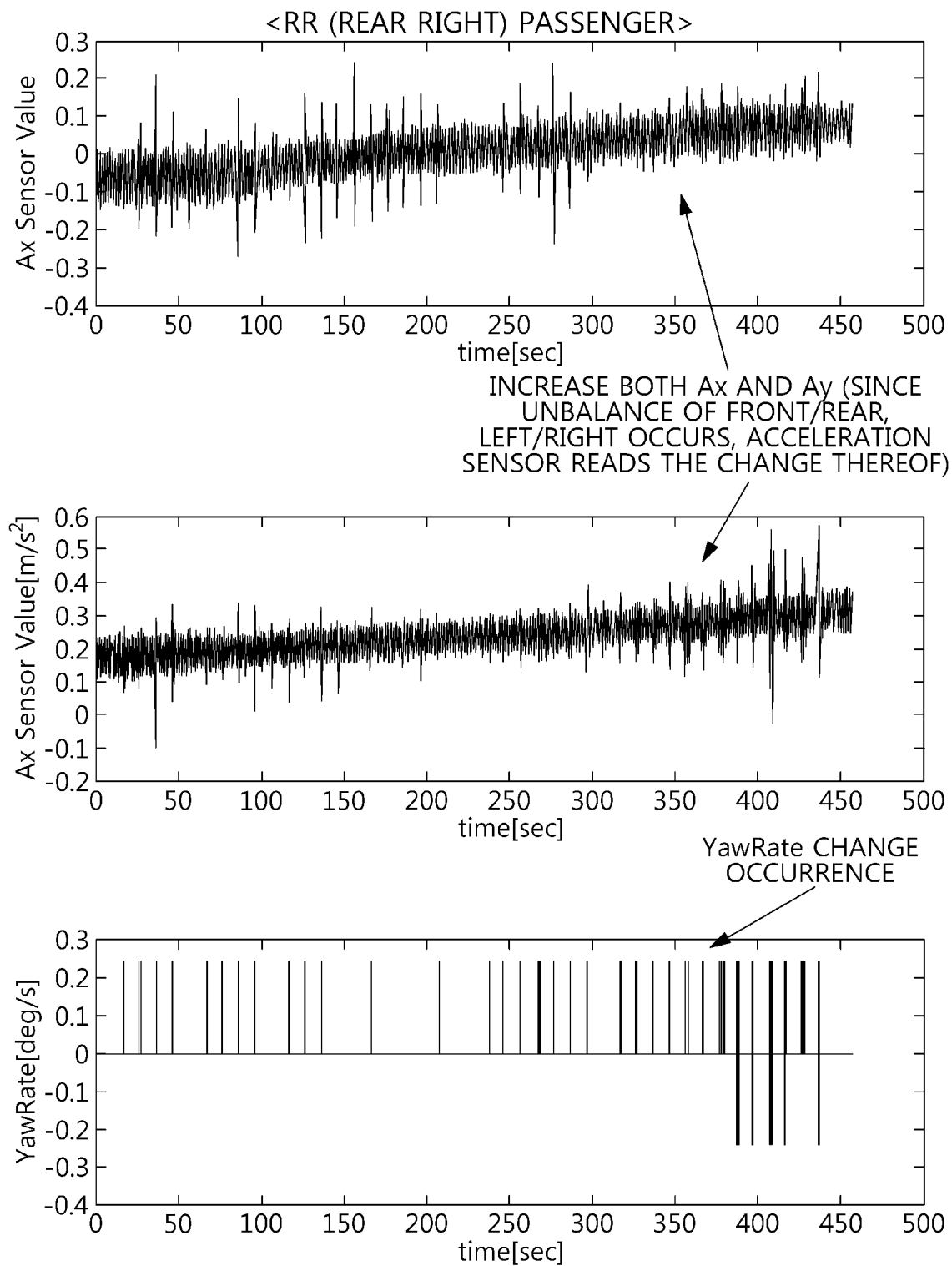
FIG. 6 illustrates a view in which passenger classification is performed by the acceleration sensor-based vehicle acceleration change in accordance with an exemplary embodiment of the present disclosure.

FIGS. 5 and 6 illustrate an example that the vehicle 1, in which the driver is seated on a driver seat 4a and the passenger is seated on the rear right seat 5c, applies about 16% inclination (i.e., about 9 degrees) as the vehicle stop condition. Referring to FIG. 5, the sensor controller 30 may be configured to classify the front seat 4 into a driver location ① of the driver seat 4a and a front passenger location ② of a front passenger seat 4b, classify the rear seat 5 into a rear left location ③ of a rear left seat 5a, a rear middle location ④ of a rear middle seat 5b, and a rear right location ⑤ of a rear right seat 5c, and classify a trunk 7 into a trunk location ⑥.

The acceleration sensor 21 may be configured to detect the vehicle acceleration change of the vehicle 1 with the number of passengers and the vehicle stop condition. The sensor controller 30 may then be configured to confirm the vehicle acceleration change on each of the driver location ①, the front passenger location ②, the rear left location ③, the rear middle location ④, the rear right location ⑤, and the trunk location ⑥.

Referring to FIG. 6, the acceleration sensor 21 may be configured to detect the change in the detected values of the longitudinal acceleration (Ax), the lateral acceleration (Ay), and the yaw rate from the change amount of the acceleration sensor value that changes depending upon the passenger occupancy location and the passenger weight. The sensor controller 30 may then be configured to determine the change in each of the longitudinal acceleration (Ax), the lateral acceleration (Ay), and the yaw rate from the change in the detected value that is read therefrom. Particularly, the sensor controller 30 may be configured to classify an increase in the longitudinal acceleration (Ax) and the lateral acceleration (Ay) or an increase in the longitudinal acceleration (Ax) or no-change of the lateral acceleration (Ay).

In particular, the increase in the longitudinal acceleration (Ax) and the lateral acceleration (Ay) indicates the unbalance of front/rear and left/right weight of the vehicle 1, and the increase in the longitudinal acceleration (Ax) indicates the unbalance of front/back weight, and the no-change of the lateral acceleration (Ay) indicates the balance of left/right weight. As a result, the sensor controller 30 may be configured to classify the passenger into a child and an adult while detecting by classifying the acceleration-based passenger location into the driver seat 4a, the front passenger seat 4b, the rear left seat 5a, the rear middle seat 5b, and the rear right seat 5c.

As described above, the sensor controller 30 may be configured to classify the driver location ①, the front passenger location ②, the rear left location ③, the rear middle location ④, the rear right location ⑤, and the trunk location ⑥, and thus, the acceleration sensor 21 may replace each function of the weight sensor 23 and the ultrasonic sensor 24. Accordingly, the passenger occupancy detection system 10 may be configured to operate the passenger-seat occupant classification advanced airbag system and the rear-seat passenger notification system with only the acceleration sensor 21 without using the weight sensor 23 and the ultrasonic sensor 24, which decreases costs for the rear-seat passenger notification system 200 and the passenger-seat occupant classification advanced airbag system 300.

Referring again to FIG. 1, in the operating of the rear-seat passenger notification system S20~S80, the sensor controller 30 may be configured to perform the determining of the door opening S20, the activating (ON) of the rear-seat passenger notification system S30, and the confirming of the Fail-Safe based passenger motion S40~S60. Referring to FIG. 4, the sensor controller 30 may be configured to confirm the door opening when the vehicle is stopped using the signal of the door opening sensor 22 transmitted via controller area network (CAN) communication in the determining of the door opening S20 as the input information. In particular, the sensor controller 30 may be configured to acquire as a CAN signal by classifying the signal into a door opening signal 1 and a door closing signal 0 for warning the driver of the door opening, and the door opening signal 1 and the door closing signal 0 may be classified into front left and right doors, rear left and right doors, and a trunk door, respectively.

Referring to FIG. 2, the sensor controller 30 may be configured to confirm the passenger motion S60 by detecting the acceleration-based passenger motion S45 using the acceleration sensor 21 and may be configured to detect the sensor-based passenger motion S55 using the ultrasonic sensor 24 when confirming the Fail-Safe based passenger motion S40~S60 upon opening of the door. Particularly, in confirming the Fail-Safe based passenger motion S40~S60, the sensor controller 30 may be configured to detect the acceleration-based passenger motion based on the detection of the acceleration sensor signal S40~S45, detect the sensor-based passenger motion based on the operation of the ultrasonic sensor S50~S55, and confirm the passenger motion S60.

Figure 7:
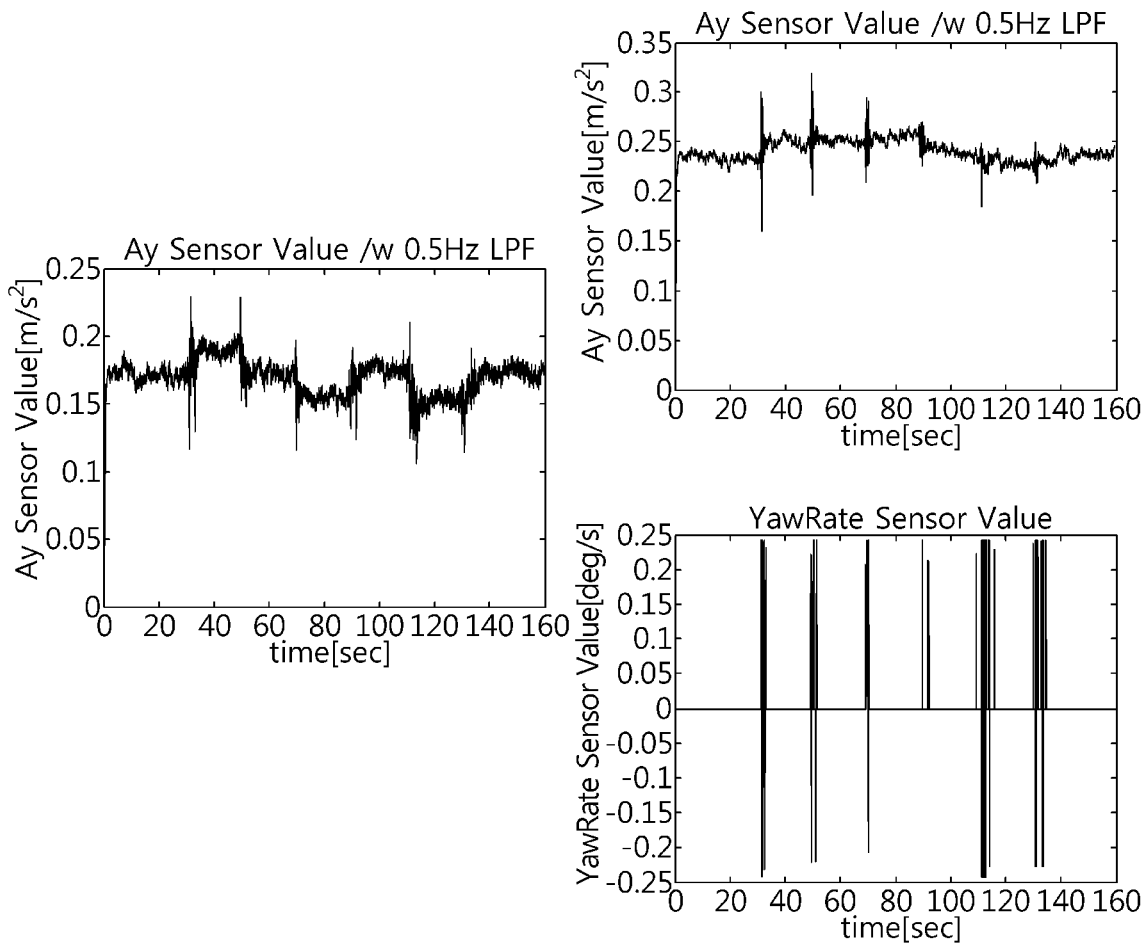
FIG. 7 illustrates an experimental example detecting passenger motion by the acceleration sensor in accordance with an exemplary embodiment of the present disclosure.
Figure 8:
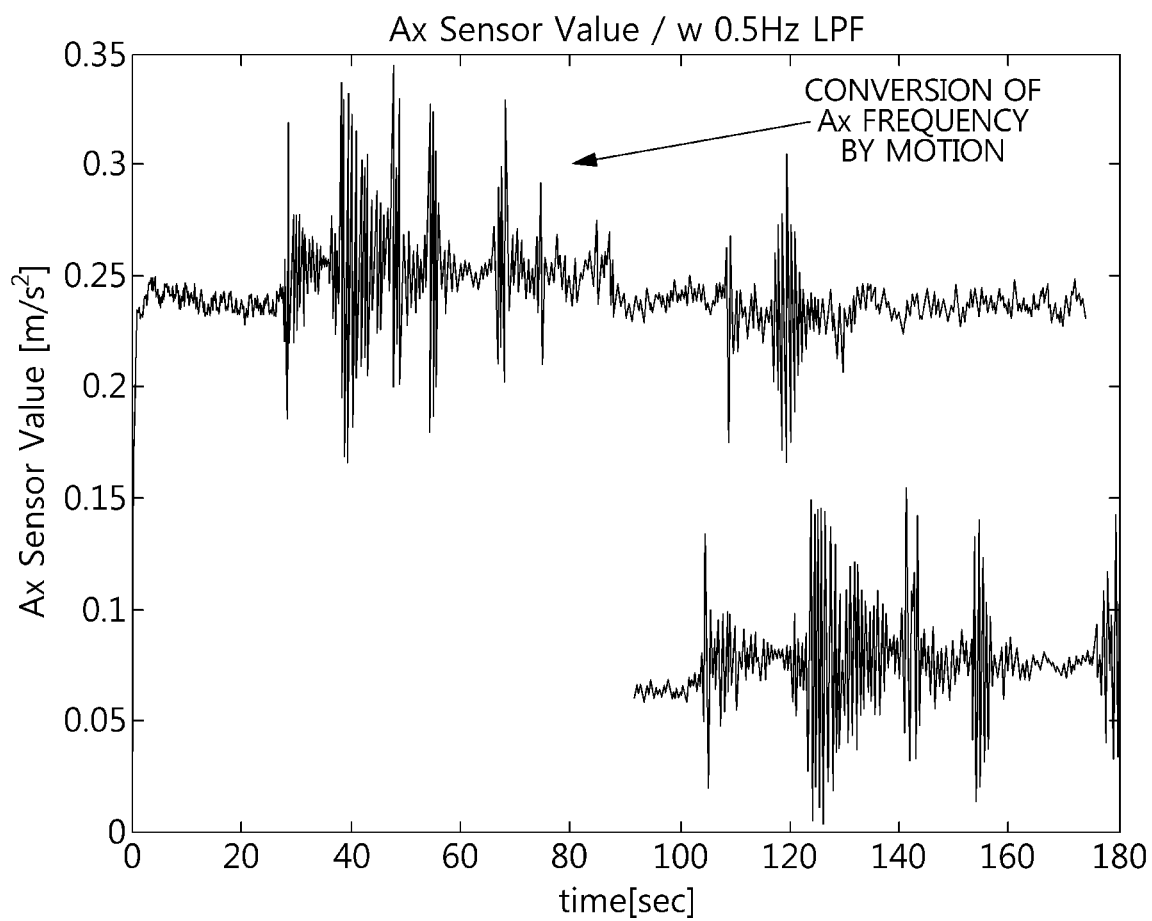
FIG. 8 is illustrates the acceleration sensor detecting passenger motion by a longitudinal acceleration in accordance with an exemplary embodiment of the present disclosure.
Figure 9:
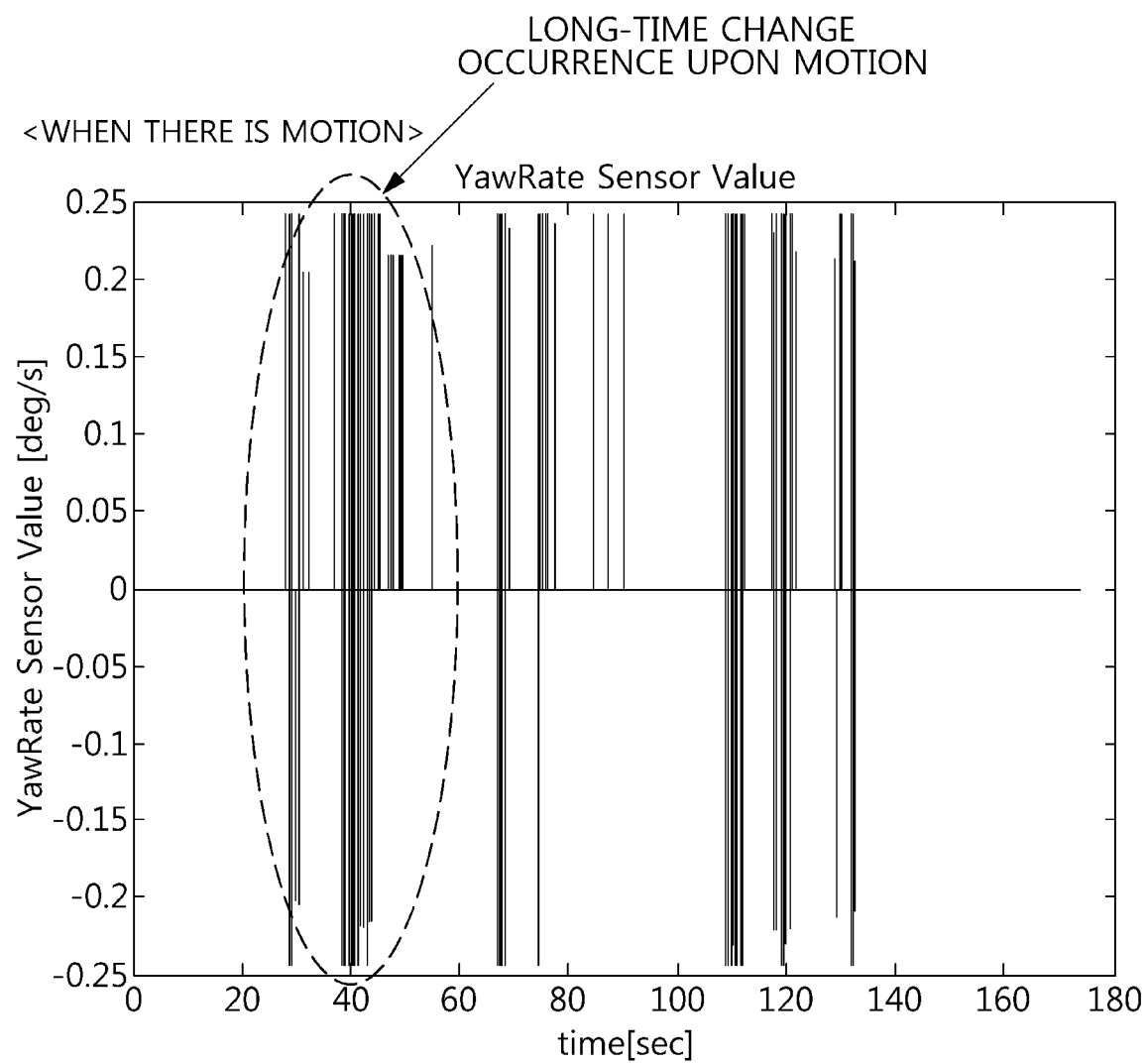
FIG. 9 is illustrates the acceleration sensor detecting passenger motion by the change time in a yaw rate in accordance with an exemplary embodiment of the present disclosure.

FIGS. 7 to 9 illustrate examples in which the sensor controller 30 uses the acceleration sensor 2. FIG. 7 is an experimental example of detecting the passenger motion; and RR refers to the rear right seat 5c, RC refers to the rear middle seat 5b, RL refers to the rear left seat 5a, Ax refers to the longitudinal acceleration, Ay refers to the lateral acceleration, and YawRate refers to the yaw rate, respectively. Accordingly, FIG. 8 illustrates passenger motion as a frequency change of a longitudinal acceleration (Ax) in the absence of the passenger motion, and FIG. 9 illustrates passenger motion as a change time of the yaw rate in the absence of the passenger motion.

For example, the detecting the acceleration-based passenger motion based on detecting the acceleration sensor signal S40~S45 may be classified into detecting the acceleration sensor signal S40, correcting the acceleration sensor value S41, distinguishing the change in the acceleration sensor value S42, distinguishing the passenger change S43, analyzing the frequency and calculating the variance of the acceleration sensor value in the S44, and detecting the acceleration-based passenger motion in the S45. In the detecting of the acceleration sensor signal S40, the sensor controller 30 may be configured to detect (e.g., read) the vehicle acceleration change of the vehicle 1 due to the boarding or exiting of the passenger when the door is opened from the acceleration sensor 21. In the correcting of the acceleration sensor value S41, the sensor controller 30 may be configured remove unnecessary noise utilizing a Low Pass Filter (LPF).

In addition, in the distinguishing of the change in the acceleration sensor value S42, the sensor controller 30 may be configured to confirm the occurrence of the abrupt difference between previous acceleration value and current acceleration value upon the 1-second interval filtering (the tunable interval of a Moving Average filter) for the acceleration value to confirm the occurrence of the weight change with the change in the acceleration sensor value upon occurrence of the door opening signal 1 at a specific location. In particular, when the passenger is present on the rear left seat 5a of the rear seat 5, the longitudinal acceleration (Ax) increases, the lateral acceleration (Ay) decreases, and the yaw rate changes.

In the distinguishing of the passenger change S43, the sensor controller 30 may be configured to distinguish between the boarding or exiting of the passenger using the door opening signal for determining the location where the first weight change may occur and the acceleration sensor change value for determining the movement and motion of the passenger, respectively. This considers the possibility that the passenger has been seated but moves toward the opened door when it is determined that the passenger is present when the door has been opened and then closed.

In analyzing the frequency and calculating the variance of the acceleration sensor value S44, the sensor controller 30 may be configured to distinguish the motion state of the passenger through the change time of the yaw rate together with analyzing the frequency and calculating the variance of the acceleration sensor value. In particular, the analyzing the frequency of the longitudinal acceleration (Ax) may distinguish the passenger state for the passenger motion not filtered by the Low Pass Filter (LPF) of 0.5 Hz, the calculating the variance of the longitudinal acceleration (Ax) may distinguish whether the passenger is in a sleeping state or in a moving state, and the change time of the yaw rate continuously changes while the passenger is moving, such that the passenger motion may be integrally distinguished using these factors.

Accordingly, the sensor controller 30 may be configured to complete the detection of the acceleration-based passenger motion in the detecting the acceleration-based passenger motion S45. Accordingly, the Fail-Safe of the ultrasonic sensor 24 may be implemented by the acceleration sensor 21. For example, in detecting the sensor-based passenger motion based on the operation of the ultrasonic sensor S50~S55, the sensor controller 30 may be configured to confirm the ultrasonic sensor S50 and detect the sensor-based passenger motion S55. Referring to FIG. 3, the sensor controller 30 may be configured to detect the passenger motion using the signal of the operation of the ultrasonic sensor transmitted via the CAN communication as the input information in the confirming the ultrasonic sensor S50. Then, the sensor controller 30 may be configured to complete the detection of the sensor-based passenger motion with the passenger motion detected by the ultrasonic sensor in the detecting of the sensor-based passenger motion S55.

For example, in confirming the passenger motion S60, the sensor controller 30 may be configured to set the acceleration-based passenger motion and sensor-based passenger motion to a specific value for confirming the passenger motion, respectively, and map the values to each other to set one value for confirming the passenger motion. Particularly, the mapping may be constructed as a mapping table.

Referring again to FIG. 2, in the operating of the rear-seat passenger notification system S20-S80, the sensor controller 30 may be configured to provide a notification regarding the passenger change S70 and warn the driver S80. Referring to FIG. 4, in notifying the passenger change S70, the sensor controller 30 may be configured to output a signal to the passenger display unit 9a such as operating a flashing lamp or an alarm sound in the driver seat cluster 9. In addition, in warning the driver S80, the sensor controller 30 may be configured to output a signal to the smartphone 100 of the driver. In addition, although not illustrated, the sensor controller 30 may be configured to turn on an emergency lamp of the vehicle 1.

Accordingly, the passenger occupancy detection system 10 may operate the rear-seat passenger notification system 200 through the operating the rear-seat passenger notification system S20-S80. Particularly, the rear-seat passenger notification system 200 may use the sensor-based passenger motions S50, S55 of the ultrasonic sensor 24 together based on the acceleration-based passenger motions S40-S45 by the acceleration sensor 21, thus implementing the Fail-Safe for the sensor while increasing the possibility of the passenger occupancy. The rear-seat passenger notification system 200 may be configured to acquire or detect the acceleration-based passenger motions S40-S45 using only the acceleration sensor 21 without using the ultrasonic sensor 24 that acquires the sensor-based passenger motions S50, S55, thus saving cost without an additional sensor to replace the ultrasonic sensor.

Referring again to FIG. 1, in operating the passenger-seat occupant classification advanced airbag system S100-S150, the sensor controller 30 may be configured to determine the airbag deployment situation S100, activate (ON) the passenger-seat occupant classification advanced airbag system S110, confirm the weight sensor S120, perform the sensor-based passenger classification S121, perform the acceleration-based passenger classification S130, generate the airbag operation signal S140, and deploy the passenger classification airbag S150.

Referring to FIG. 4, the sensor controller 30 may be configured to provide a door closing signal to the airbag control unit (ACU) in determining the airbag deployment situation S100, and may return to the S10 when it is not in the airbag deployment situation, while detecting the activation of the passenger-seat occupant classification advanced airbag system 300 as in the S110 by detecting the operation of the Airbag Control Unit (ACU) in the airbag deployment situation. Then, the sensor controller 30 may be configured to read the sensor-based passenger classification signal in the S121 generated based on the weight sensor 23 in the S120 from the airbag control unit (ACU), and also read the acceleration-based passenger classification signal by the acceleration sensor 21 via the CAN communication. As a result, the sensor controller 30 may complete the passenger classification with the sensor-based passenger classification signal and the acceleration-based passenger classification signal in generating the airbag operation signal S140. Accordingly, the Fail-Safe of the weight sensor 23 may be implemented by the acceleration sensor 21.

For example, in the performing the passenger classification S140, the sensor controller 30 may be configured to set the acceleration-based passenger classification and the sensor-based passenger classification as a specific value for the passenger classification, respectively, and map these values to each other to set one value for the passenger classification. Particularly, the mapping may be constructed as a mapping table. Then, the sensor controller 30 may be configured to provide the passenger classification signal to the airbag control unit (ACU) in deploying the passenger classification airbag S150, such that the airbag control unit (ACU) may be configured to deploy the airbag for a child-use or an adult-use.

Accordingly, the passenger occupancy detection system 10 may be configured to operate the passenger-seat occupant classification advanced airbag system 300 through the operating the passenger-seat occupant classification advanced airbag system S100-S150. Particularly, the passenger-seat occupant classification advanced airbag system 300 may be configured to use the sensor-based passenger classification S120, S121 of the weight sensor 23 together based on the passenger classification S130 by the acceleration sensor 21, thus implementing the Fail-Safe of the sensor while increasing the classification possibility for a child and an adult. Particularly, the passenger-seat occupant classification advanced airbag system 300 may apply the acceleration-based passenger classification S130 with only the acceleration sensor 21 without using the weight sensor 23 for confirming the sensor-based passenger classification S120, S121, thus saving cost without an additional sensor to replace the weight sensor.

Meanwhile, the passenger occupancy detection system 10 may enable the function enhancement to cooperate a chassis control of the electronic controlled suspension (ECS), which may estimate the weight operating on each location when a passenger is seated at a specific location, or a chassis control of the electronic stability control (ESC) and the traction control system (TCS) by a chassis integrated control using the detected value of the acceleration sensor 21.

As described above, the passenger occupancy detection system 10 in accordance with the present exemplary embodiment may be configured to read the sensor value using the electronic stability control (ESC) sensor as the acceleration sensor in the sensor controller 30 when the vehicle is stopped, distinguish the in-vehicle passenger with the vehicle acceleration change by the sensor value, control the operations of the rear-seat passenger notification system 200 and the passenger-seat occupant classification advanced airbag system 300 so that an individual operation thereof is performed depending upon the rear-seat passenger and the front-passenger-seat occupant, thus saving cost by replacing the weight sensor (the passenger classification sensor) 23 or the ultrasonic sensor 24, and particularly, enhancing the sensor reliability by providing the Fail-Safe while increasing the accuracy of the passenger detection utilizing the longitudinal/lateral accelerations/yaw rate information.

What is claimed is:

1. A passenger detection method, includes distinguishing of an in-vehicle passenger,
wherein the distinguishing of the in-vehicle passenger includes:
recognizing, by a sensor controller, passenger location and passenger classification of the passenger by detecting an acceleration sensor value indicating a vehicle acceleration change when a vehicle is stopped, and calculating a change amount thereof;
determining, by the sensor controller, an operation condition for a rear-seat passenger notification system when a door of the vehicle is opened; activating, by the sensor controller, the rear-seat passenger notification system;
detecting, by the sensor controller, a passenger motion of an acceleration-based passenger motion using the acceleration sensor value;
confirming, by the sensor controller, a fail safe for a sensor-based passenger motion of an ultrasonic sensor detecting the passenger motion of the acceleration-based passenger motion using the acceleration sensor value; and
providing, by the sensor controller, passenger information for the passenger motion to a driver,
wherein the acceleration-based passenger motion is determined by:
correcting, by the sensor controller, to remove an unnecessary noise of the acceleration sensor value by a Low Pass Filter (LPF);
distinguishing, by the sensor controller, a change of the acceleration sensor value by an abrupt difference between previous acceleration value and current acceleration value through a filtering at a predetermined interval;
distinguishing, by the sensor controller, a change of the passenger; and
detecting, by the sensor controller, the acceleration-based passenger motion by calculating the acceleration sensor value, and
wherein the calculating of the acceleration sensor value is reflected in the change in weight due to passenger occupancy and state when the vehicle is stopped.

2. The passenger detection method of claim 1, wherein the acceleration sensor value is a longitudinal acceleration, a lateral acceleration, and a yaw rate.

3. The passenger detection method of claim 1, wherein the passenger classification of the in-vehicle passenger for a vehicle seat is distinguished as a passenger occupancy seat of a child and an adult for a load.

4. The passenger detection method of claim 3, wherein the passenger occupant seat is classified into a driver seat at a driver location, a front passenger seat at a front passenger location, a rear left seat at a rear left location, a rear middle seat at a rear middle location, and a rear right seat at a rear right location.

5. The passenger detection method of claim 1, wherein the distinguishing of the passenger change is performed considering a signal generation of a door opening sensor and the ultrasonic sensor.

6. The passenger detection method of claim 1, wherein the calculation of the acceleration sensor value is performed by a frequency analysis and variance for the longitudinal acceleration and the lateral acceleration, and a change time of the yaw rate is considered.

7. The passenger detection method of claim 1, wherein the confirming of the passenger motion is performed by the acceleration-based passenger motion when the sensor controller to the ultrasonic sensor is not detected.

8. The passenger detection method of claim 1, wherein the sensor controller transmitting the passenger information is connected to a notification to the passenger display unit of a driver seat cluster and a driver's smartphone of the change in the boarding/exiting of the passenger in the vehicle due to the door opening.

9. The passenger detection method of claim 1, wherein the distinguishing of the in-vehicle passenger includes:
determining, by the sensor controller, an operation condition for a passenger-seat occupant classification advanced airbag system when by an airbag deployment situation; and
distinguishing, by the sensor controller, the operation of an advanced system operating the passenger-seat occupant classification advanced airbag system using the acceleration sensor value as a fail safe for a weight sensor.

10. The passenger detection method of claim 9, wherein the operation of the passenger-seat occupant classification advanced airbag system includes:
activating, by the sensor controller, the passenger-seat occupant classification advanced airbag system;
generating, by the sensor controller, an airbag operation signal by setting the passenger classification as an acceleration-based passenger classification, setting the passenger classification of the weight sensor as a sensor-based passenger classification, and performing a fail safe for the sensor-based passenger classification with the acceleration-based passenger classification; and
performing, by the sensor controller, an airbag deployment with the airbag operation signal.

11. The passenger detection method of claim 10, wherein the generating the airbag operation signal is formed by the acceleration-based passenger classification when the weight sensor is not applied.

12. A passenger occupancy detection system, comprising:
a sensor controller as defined in claim 1,
wherein the sensor controller is configured to distinguish the in-vehicle passenger using a sensor value of the acceleration sensor when the vehicle is stopped, and individually operate the rear-seat passenger notification system depending upon the vehicle door opening situation and a passenger-seat occupant classification advanced airbag system depending upon an airbag deployment situation.

13. The passenger occupancy detection system of claim 12, wherein the acceleration sensor is a micro electro mechanical systems (MEMS) acceleration sensor.

14. The passenger occupancy detection system of claim 12, wherein the sensor controller is configured to utilize the acceleration sensor as fail safe for the ultrasonic sensor upon operation of the rear-seat passenger notification system, or utilize the acceleration sensor as fail safe for a weight sensor upon operation of the passenger-seat occupant classification advanced airbag system; and provide the distinguishing of the in-vehicle passenger to a passenger display unit of a driver seat cluster or to a smartphone of a driver.

* * * * *